US005544907A

United States Patent [19]
Lin et al.

[11] Patent Number: 5,544,907
[45] Date of Patent: Aug. 13, 1996

[54] COMPOSITE BICYCLE FRAME WITH Y SHAPED TUBULAR CONFIGURATION

[75] Inventors: Chin-l Lin, Tainan Hsien; Yu-Hsuan Chen, Kao Hsiung; Gou-Don Chu, Hsing Chu, all of Taiwan

[73] Assignee: Industrial Technology Research Institute, Hsinchu Hsien, Taiwan

[21] Appl. No.: 414,257

[22] Filed: Mar. 31, 1995

[51] Int. Cl.$^6$ ....................................................... B62K 3/02
[52] U.S. Cl. ......................... 280/288.3; 280/283; 280/288
[58] Field of Search ................................. 280/281.1, 283, 280/284, 288, 288.3, 274, 275

[56] References Cited

U.S. PATENT DOCUMENTS

| | | | |
|---|---|---|---|
| 4,230,332 | 10/1980 | Porsche | 280/281 |
| 4,479,662 | 10/1984 | Defour et al. | 280/281 |
| 4,513,986 | 4/1985 | Trimble | 280/281 |
| 4,850,607 | 7/1989 | Trimble | 280/281.1 |
| 4,889,355 | 12/1989 | Trimble | 280/281.1 |
| 4,902,458 | 2/1990 | Trimble | 264/46.6 |
| 4,941,074 | 7/1990 | DeCosse et al. | 362/61 |
| 4,982,975 | 1/1991 | Trimble | 280/281.1 |
| 4,986,949 | 1/1991 | Trimble | 264/258 |
| 5,273,303 | 12/1993 | Hornzee-Jones | 280/288.3 |
| 5,415,423 | 5/1995 | Allsop et al. | 280/281.1 |

*Primary Examiner*—Kevin T. Hurley
*Attorney, Agent, or Firm*—W. Wayne Liauh

[57] ABSTRACT

A composite bicycle frame containing a hollow slanted-Y-shaped front frame portion, a hollow upper support paw and a hollow lower support paw. The hollow slanted-Y-shaped front frame portion comprises: (1) a generally common junction; (2) a main tube connected between the front fork assembly of the bicycle and a middle portion of the common junction in a slanted manner; (3) an upper branch tube connected between the seat assembly of the bicycle and an upper portion of the common junction in a slanted manner; and (4) a lower branch tube connected between the pedal support assembly of the bicycle and a lower portion of the common junction in a slanted manner. The hollow upper support paw is connected between the seat assembly and the rear wheel shaft assembly of the bicycle, and the hollow lower support paw connected between the pedal support assembly and the rear wheel shaft assembly. A set of generally hollow front, seat tube and bottom bracket junctions are provided for connecting, respectively, (1) between the hollow main tube and the head tube, (2) among the hollow upper branch tube, the seat tube sleeve, and the upper support paw, and (3) among the hollow lower branch tube, the bottom bracket tube, and the lower support paw. Each of the hollow tubes, paws, and junctions comprises at least a fibrous material impregnated with a synthetic resin, and these tubes, paws, and junctions are integrally united by overlapping edges of the resin impregnated fibrous material. The upper support paw and the lower support paw are connected to the rear wheel assembly at opposite sides thereof, with the upper support paw being disposed at the same side as the drive chain of the bicycle. This allows great flexibility to be obtained in designing bicycle chain related components, such as the crank set assembly and the rear derailleur assembly.

25 Claims, 8 Drawing Sheets

COMPOSITE BICYCLE FRAME WITH Y SHAPED TUBULAR CONFIGURATION

FIELD OF THE INVENTION

The present invention relates to bicycle frames. More particularly, the present invention relates to hollow ultralight unitary bicycle frames made from composite materials, and the method of making the same. The composite bicycle frames disclosed in the present invention are of a unitary, i.e., single-piece, structure without any welding or abutting joints; they provide the advantages of having improved aerodynamic shape, reduced weight, reduced drag coefficient, and providing comfort to the riders by effectively absorbing vertical shocks. Furthermore, the composite bicycle frame disclosed in the present invention, and the bicycles incorporating the same, can be manufactured with reduced material consumption and improved production operation, so as to result in lowered manufacturing cost while provide high-quality and high-performance bicycles.

BACKGROUND OF THE INVENTION

Conventionally, bicycle frames are of a diamond shape, comprising eight individual tubes, which could be made of metal or graphite fiber composites. The metal tubes are typically welded or brazed together, and the composite bicycle frames are typically formed either by securely joining the separate composite graphite tubes or by molding the tubes together as a one-piece, or unitary, frame.

A conventional diamond-shaped bicycle frame comprises a front triangle and a rear triangle. The front triangle comprises (a) a head tube for connecting to the bicycle handle bar and the front wheel assembly; (b) a seat tube having an upper portion connecting to the bicycle seat and a lower portion connected to the pedal support: (c) an upper tube connecting between the head tube and the upper portion of the seat tube: and (d) a lower tube connecting between the head tube and the portion of the seat tube.

On the other hand, the rear triangle of the conventional diamond-shaped frame comprises: (a) a left seat stay tube and (b) a right seat stay tube, both of which being provided in a rear upper fork comprising for connecting between the left upper portion of the seat tube and the left portion of the rear wheel assembly, and the right upper portion of the seat tube and the right portion of the rear wheel assembly, respectfully; and (c) a left chains stay tube and (d) a right chain staying tube, both of which being provided in a rear lower fork connecting between the left lower portion of the seat tube and the left portion of the rear wheel assembly, and the right lower portion of the seat tube and the right portion of the rear wheel assembly, respectfully.

Several methods have been taught in the prior art for making bicycle frames from individual thin-shelled graphite composite tubes. For example, U.S. Pat. No. 4,513,986 discloses a monocoque bicycle frame where the structural support is provided by a formed, stressed skin, in conjunction with internal stiffening ribs. U.S. Pat. No. 4,230,332 discloses another type of bicycle frame comprising a hollow panel extending between and secured to the tubular steering column and the tubular seat column replacing the hollow tubing ordinarily found in conventional bicycle frames. On the other hand, U.S. Pat. No. 4,479,662 discloses a bicycle frame using fittings that are generally hollow and have male assembly bearings with a decreasing taper section up to their ends and a larger section which is smaller than the section of the branch connections that are lengthened by the bearings. The corresponding ends of the tubes of the frame are secured adhesively by adapting them around the bearings the ends being formed with inside bearings with an increasing taper section up to the end corresponding to the male assembly bearings of the fittings. All these methods share a common disadvantage that, before all the tubes are joined together, they must be made individually. This involves not only long manufacturing time but also unnecessarily high production cost. In these methods, each and every element must be prepregged, and careful considerations must be employed for each tube regarding wrapping angle, overlapping style, patching, curing, molding, etc.

The so-called unitary bicycle frames eliminate many of the problems associated with having to adjoin individual tubes discussed above in making bicycle frames. These unitary bicycle frames are taught in U.S. Pat. Nos. 4,850,607; 4,889,355; 4,902,458; 4,941,674; 4,982,975; and 4,986,949, the content thereof is expressly incorporated by reference. In the manufacturing of the unitary bicycle frames, no welding or adhesion is required, and the finished bicycle frame does not have abutting joints. The unitary bicycle frames, which are made of composite fibers, are also substantially lighter than metal frames. The unitary bicycle frames involve the disadvantages that they require relatively complicated molds for manufacturing, and the thickness of the finished products becomes too large resulting in undesirably heavy weight of the finished bicycle frame. Furthermore, because high molding precision is required, the molds are expensive to construct. The unitary molding process involves three bulky mold members, which often could be misaligned, causing errors in the straightness of the finished bicycle frame.

All the conventional diamond-shaped frames, whether they be made by thin-shelled tubes joined together or by the unitary molding process, place great emphasis on providing torsional rigidity and the lateral bending rigidity, at the expense of increased vertical rigidity. In other words, in order to increase the torsional and lateral rigidities, the vertical rigidity was also increased drastically. As a result, the shock-absorbing ability was compromised and much of the impact force from the ground bumpings during riding was transmitted unabatedly to the rider. With the unitary bicycle frames, because of the large number of joints, tubes, and junctions involved, it is quite time consuming to prepare all the required overlappings, thus resulting in slow production rate and relatively high cost.

SUMMARY OF THE INVENTION

Having discussed some of the disadvantages of the conventional diamond-shaped bicycle frames, the primary object of the present invention is to develop an improved hollow ultralight bicycle frame with improved shock- and vertical-impact-absorbing capability. More particularly, the primary object of the present invention is to develop a composite Y-shaped bicycle frame, which provides the required torsional and lateral rigidities without having to increase the vertical rigidity, thus imparting an excellent shock-absorbing capability so as to dampen the immediate transmission of impact force when the rider is riding on a rough road, such as when doing mountain biking.

In the novel bicycle frame disclosed in the present invention, the upper, lower, and seat tubes of the diamond-shaped frame are reduced to a Y-shaped frame (or more specifically a slanted-Y-shaped frame). The rear upper forks (i.e., the seat stay) and the lower forks (i.e., the chain stay), each containing two tubes, in the conventional construction are reduced to two single support paws, respectively, one at the left and the other at the right side of the rear wheel. In this novel design, the seat stay is now comprised of a single upper support paw provided at the right side (same side as the drive chain) of the rear wheel, and the chain stay is comprised of a single lower support paw provided at the lower side (opposite side of the drive chain) of the rear wheel. Since there is no longer a right lower fork, the present invention allows great flexibility to be obtained in designing bicycle chain related components, such as the crank set assembly and the rear derailleur assembly, etc. The right and left support paws are connected to the two branches of the Y-shaped frame, respectively. The novel design of the present invention greatly increases the productivity by vastly reducing the number of the components, thus the time required for assembling a bicycle frame; it also greatly reduces the weight of the bicycle frame. Compared to the diamond-shaped bicycle frames, the Y-shaped bicycle frame disclosed in the present invention forms a smaller angle relative to the horizontal direction, thus the aerodynamic drag can be substantially reduced. The single left and right support paws of the present invention, instead of the pair of stay tubes used in the conventional diamond-shaped frames, cause the aerodynamic drag to be further reduced.

The bicycle frame of the present invention comprises an upper branch tube a lower branch tube and a main tube 26 intersecting at a generally hollow common junction to form a slanted-Y-shaped frame, which constitutes the front portion of the bicycle frame. The upper branch tube, lower branch tube, and main tube intersect at the generally hollow common junction, all of which are integrally molded together as a hollow unitary member. The front portion of the main tube is connected to a head tube sleeve, which is provided to support the front fork assembly of the bicycle. The rear portion of the bicycle frame comprises an upper support paw and a lower support paw respectively connected to two dropouts. The upper branch tube is connected to the upper support paw and the seat tube junction via a generally hollow seat junction, and the lower branch tube is connected to the lower support paw and a bottom bracket tube via a generally hollow bottom bracket junction. The seat junction is provided to receive a bicycle seat, the dropouts are provided to receive support for rear wheel shafts, and the bottom bracket is provided to receive the pedal axle support. These described elements, include the various tubes, paws and junctions, comprise at least one layer of resin-impregnated fibrous material and are molded together to form the unitary, composite Y-shaped bicycle frame of the present invention.

In the slanted-Y-shaped bicycle frame of the present invention, because the hollow upper branch tube and the hollow lower branch intersect in an angular manner at the generally hollow common junction, a significant portion or the shock, i.e., vertical impact or vertical compliance, is absorbed before they reach the riders. This provides a great comfort of bicycle rides especially when riding on rocky roads. The slanted-Y-shaped bicycle frame of the present invention also allows the seat stay and the chain stay each to be comprised of a single support paw. Furthermore, because the lower support paw (chain stay) and the bicycle chain can be placed in opposite sides of the rear wheel, the present invention allows great flexibility in designing the bicycle frames.

Compared to the conventional unitary diamond-shaped bicycle frames, the present invention involves a much simpler design. Thus the amount of effort required in laying-up the various layers of resin impregnated tapes or sheets, or prepregs, is significantly reduced. Furthermore, a much simpler mold can be utilized for making the bicycle frames disclosed in the present invention. Another advantage of the bicycle frame of the present invention is that the amount of wasted material, and the weight associated therewith, is greatly reduced during the molding stage, thus the present invention provides a bicycle which is truly lightweight, has superior strength, allows comfort of riding, and can be manufactured with high production rate.

BRIEF DESCRIPTION OF THE DRAWING

The present invention will be described in detail with reference to the drawing showing the preferred embodiment of the present invention, wherein.

DETAILED DESCRIPTION OF THE PREFERRED EMBODIMENT

Figure 1A:
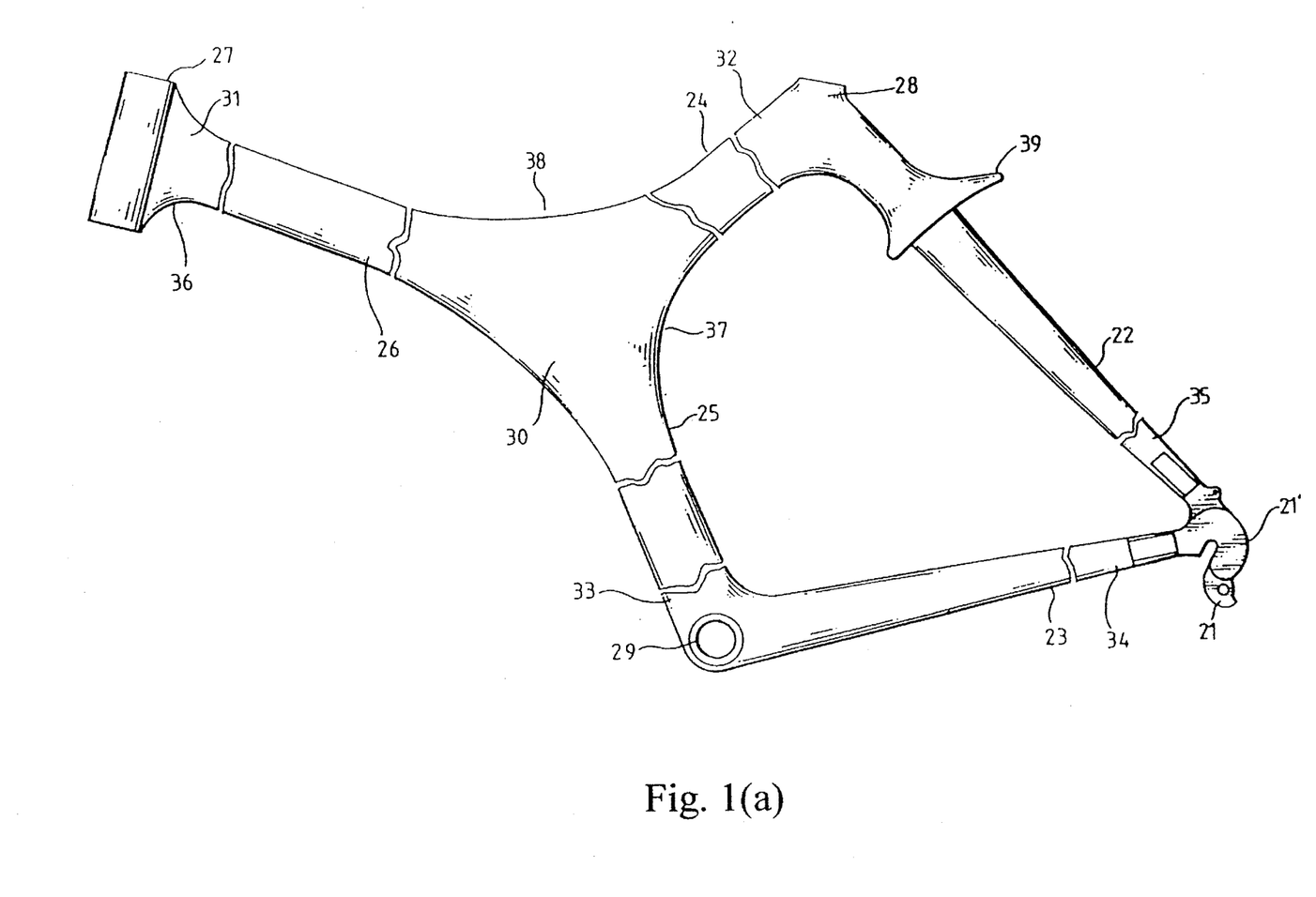
FIG. 1(a) is a side perspective view of the bicycle frame according to a preferred embodiment of the present invention.
Figure 1B:
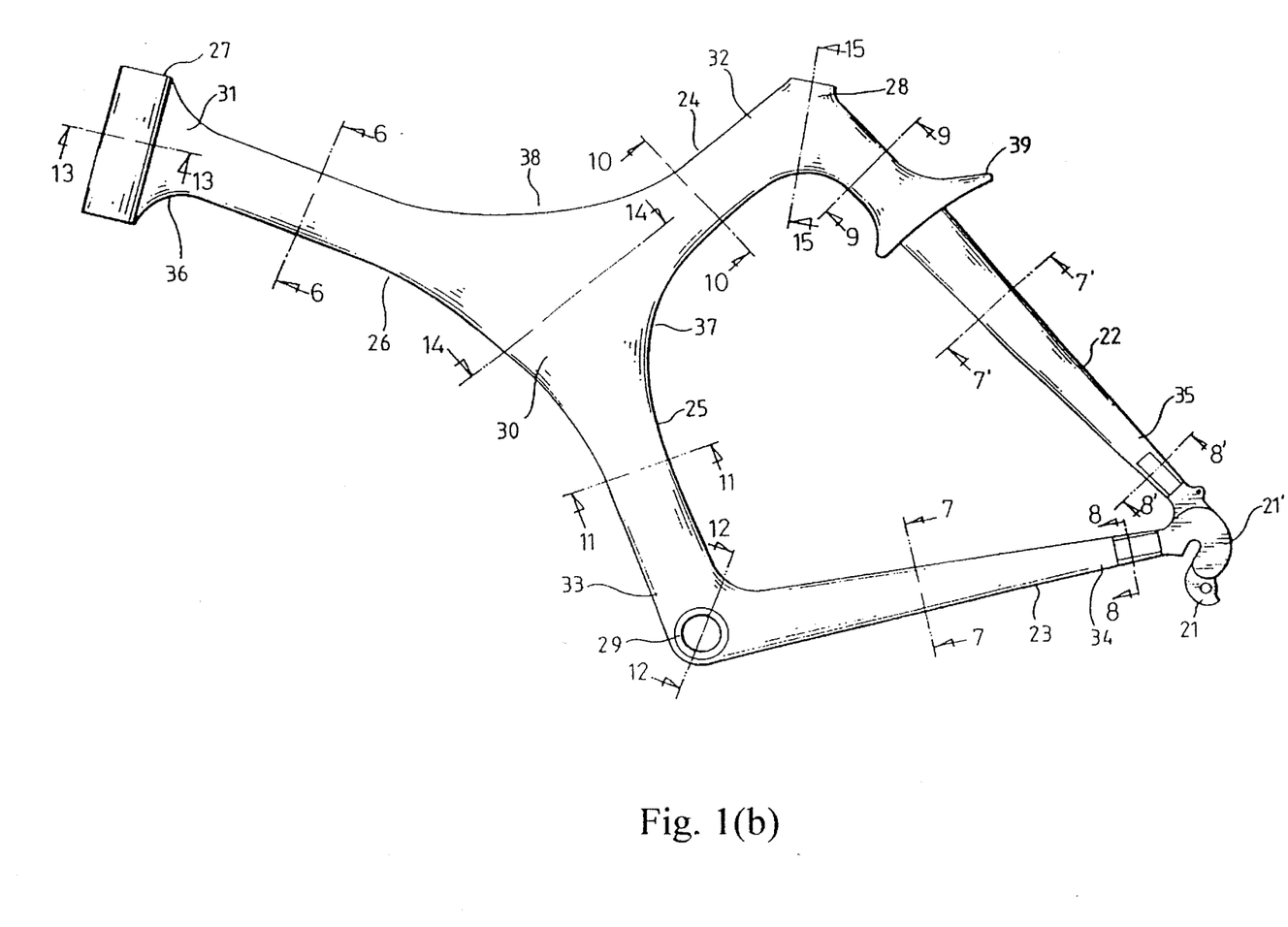
FIG. 1(b) is another side perspective view of the bicycle frame according to a preferred embodiment of the present invention.
Figure 1C:
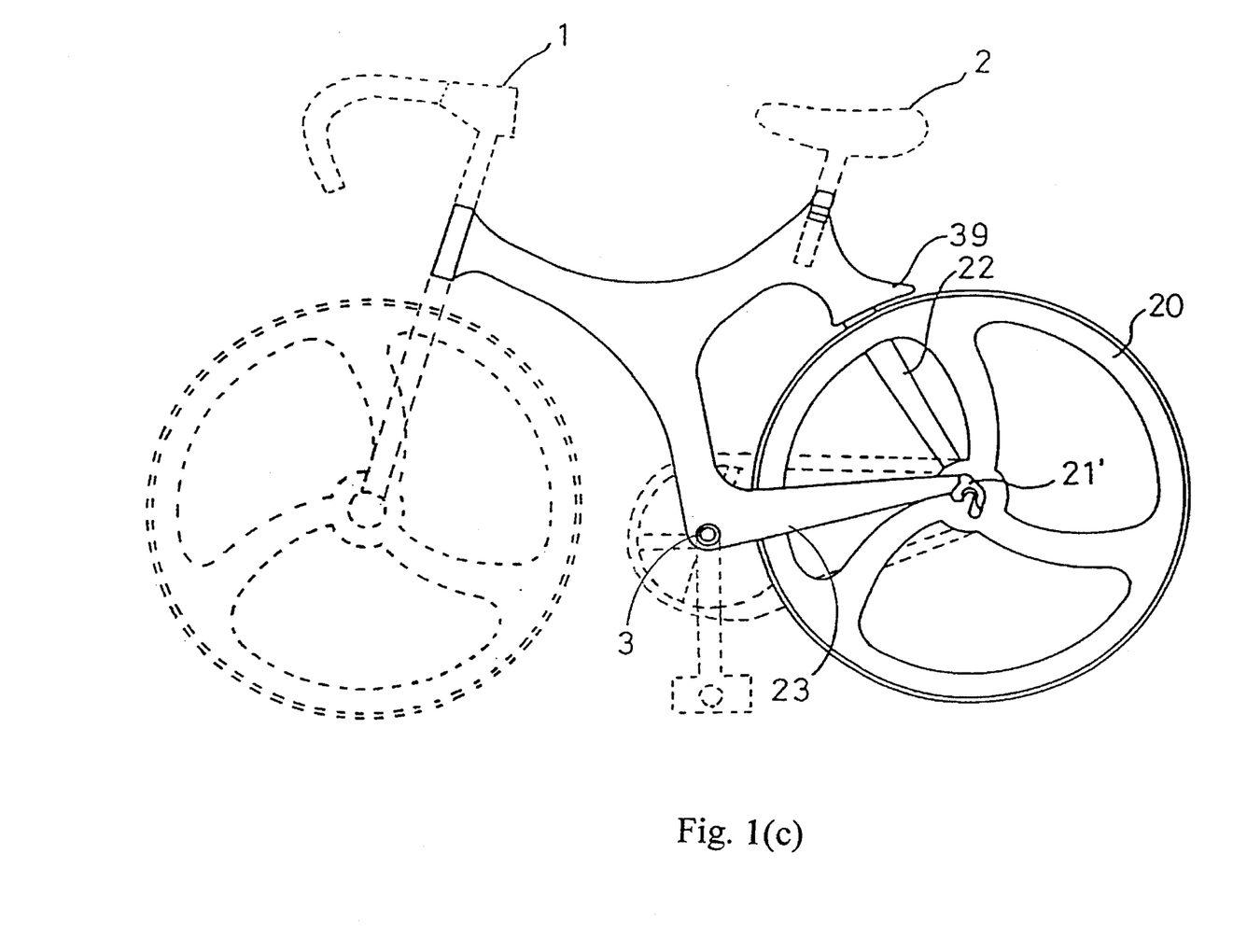
FIG. 1(c) is side perspective view of the bicycle frame according to a preferred embodiment of the present invention showing its rear portion.
Figure 2:
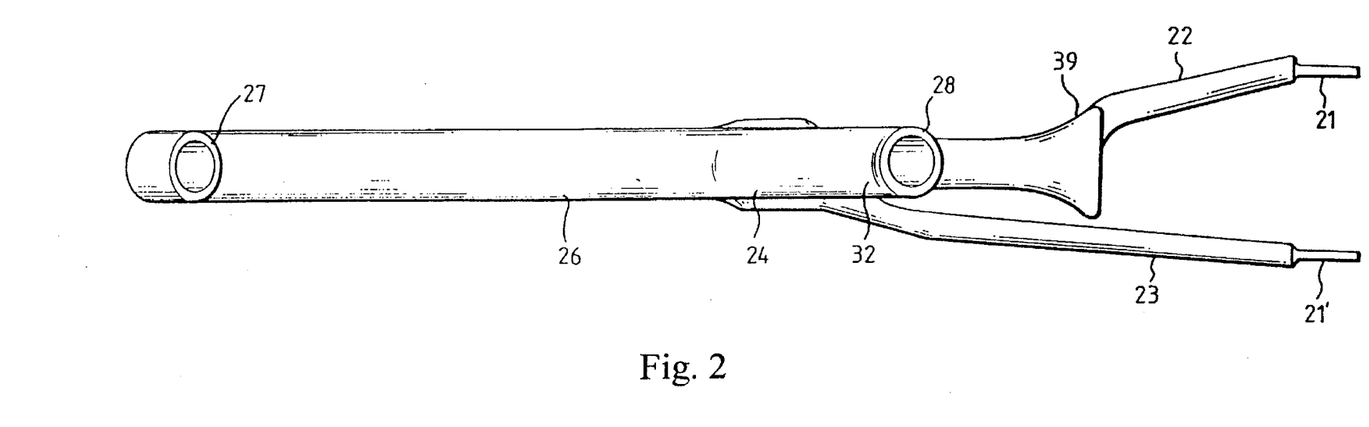
FIG. 2 is a top view of the bicycle frame of the present invention as shown in FIG. 1.
Figure 3:
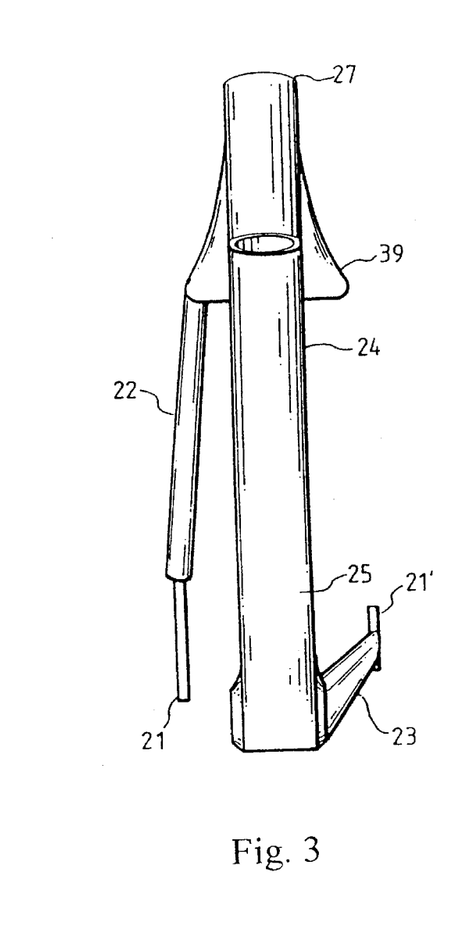
FIG. 3 is a front view of the bicycle frame of the present invention as shown in FIG. 1.
Figure 4:
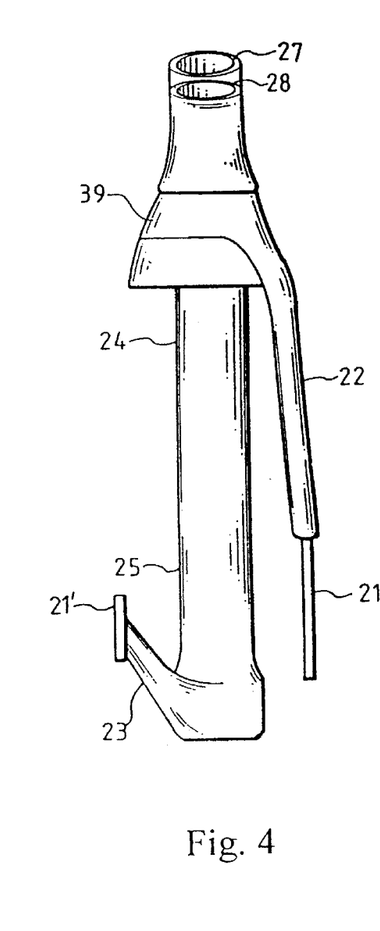
FIG. 4 is a rear view of the bicycle frame of the present invention as shown in FIG. 1.
Figure 5:
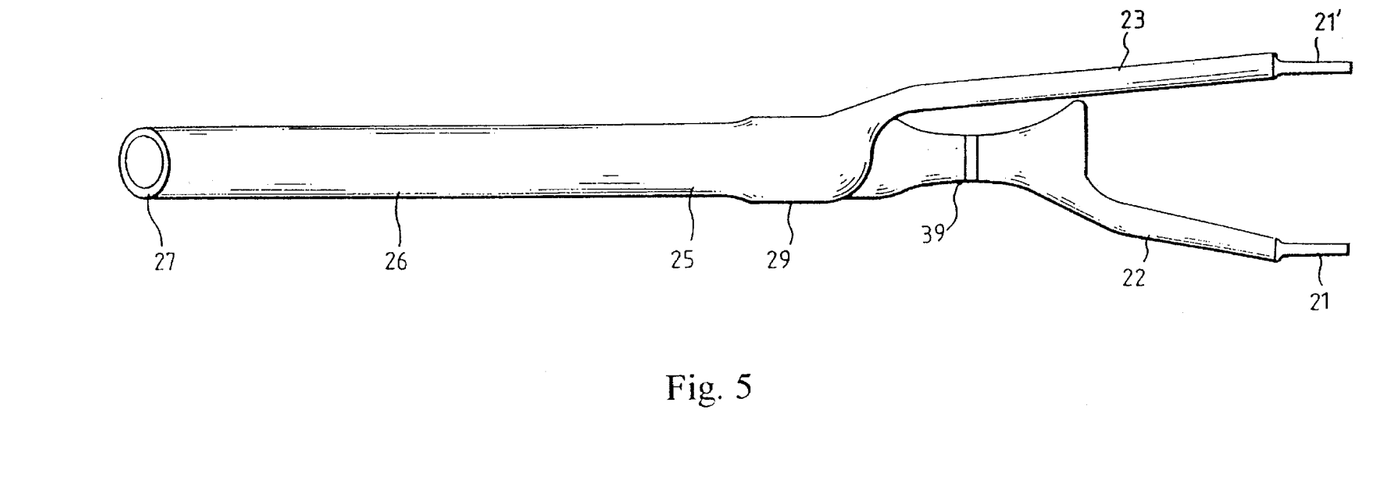
FIG. 5 is a bottom view of the bicycle frame of the present invention as shown in FIG. 1.

Now referring to the drawings, FIGS. 1–5 are the side, top, front, rear, and bottom views, respectively, of the bicycle according to a preferred embodiment of the present invention. The Y-shaped bicycle frame of the present invention comprises a hollow upper branch tube 24, a hollow lower branch tube 25, and a hollow main tube 26. The three tubes intersect at a generally hollow common junction to form the Y-shaped frame, which constitutes the front portion of the bicycle frame. The front portion of the main tube 26 is connected to a hollow head tube sleeve 27, which is provided to receive a head tube for supporting the front fork assembly, not shown, of the bicycle. The rear portion of the bicycle frame comprises the hollow upper support paw 22 and the hollow lower support paw 23. The upper support paw (which constitutes the seat stay) 22 and the lower support paw (which constitutes the chain stay) 23 are connected to the rear wheel assembly 20 via dropouts 21 and 21', respectively. The upper branch tube 24 is connected to the upper support paw 22 via seat tube sleeve 28, and the lower branch tube 25 is connected to the lower support paw 23 via bottom bracket tube sleeve 29. The seat tube sleeve 28 is provided to receive a bicycle seat, the dropouts 21, 21' are provided to receive support for the rear wheel shaft, not shown, and the bottom bracket tube sleeve 29 is provided to receive pedal axle shaft, shown as 3 in FIG. 1(*c*). The above described elements constitute the unitary, composite Y-shaped bicycle frame of the present invention. FIG. 1(*c*) shows, in dashed lines, the front fork assembly 1, seat assembly 2, pedal axle support assembly 3, and drive chain 4. These elements are inherent parts of a bicycle and thus will not be explained here.

The upper branch tube 24, lower branch tube 25, and main tube 26 intersect at a generally hollow common junction 30. The upper branch tube 24, lower branch tube 25, main tube 26 and generally hollow common junction 30 are integrally molded together as a hollow unitary member. The front end of the main tube 26 is connected to the hollow head tube sleeve 27 via a generally hollow head tube junction 31. And the top end of the upper branch 24 is connected to the seat tube sleeve 28 via a generally hollow seat junction 32. Finally, the lower branch tube 25 is connected to the bottom bracket tube sleeve 29 via a generally hollow bottom bracket junction 33. In the rear wheel portion, paws 22, 23 are connected to dropouts 21, 21' via upper and lower hollow paw junctions 34, 35, respectively. A tape-shaped patch 36 is provided which wraps the main tube 26, the head tube sleeve 27, and the front junction 31 together. Tape-shaped patches 37, 38 are also provided which wrap together between the rear end of the main tube 26 and the front portion of the common junction 30, and among the upper branch tube 24, the lower branch tube 25, and the rear portion of the common junction 30, respectively. The head tube sleeve 27, seat tube sleeve 28, and the bottom bracket sleeve 29 are provided embedding corresponding metal tubes.

In a preferred embodiment of the bicycle frame of the present invention, a mud guard 39 is provided below the intersection between the upper support paw 22 and the generally hollow seat junction 32. The mud guard 39 is a segment of the upper support paw 22; its lower surface, which is protruded radially relative to the radial cross-section of the upper support paw 22, can be curved so as to conform to the curvature of the rear wheel 20.

Figure 6:
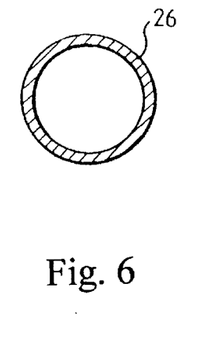
FIG. 6 is a cross-sectional view of the bicycle frame of the present invention, taken along line 6—6 of FIG. 1(b).
Figure 10:
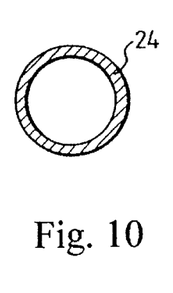
FIG. 10 is a cross-sectional view of the bicycle frame of the present invention, taken along line 10—10 of FIG. 1(b).
Figure 11:
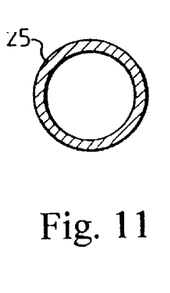
FIG. 11 is a cross-sectional view of the bicycle frame of the present invention, taken along line 11—11 of FIG. 1 (b).

FIGS. 6, 10 and 11 are the cross-sectional views of the main tube 26, upper branch tube 24 and lower branch tube 25, respectively, of the bicycle frame of the present invention. Their thicknesses are preferably in the range between 1.2 and 2.6 mm, and more preferably, about 1.6 mm. The main tube 26 is maintained at a uniform diameter in the portion within about 90 mm from the head tube 27. After the intersection between the central axes of the upper and lower branch tubes, 24 and 25, the diameter of the main tube 26 gradually increases to a maximum diameter of about 150 ~220 mm, preferably about 190 mm. The upper branch tube 24 is maintained at a uniform diameter within about 120 mm from the upper connector 32, but begins gradually increasing it diameter after the intersection between the central axes of the main tube 26 and the lower branch tube 25, to a maximum of about 150~220 mm, preferably 190 mm. Likewise, the lower branch tube 25 is maintained at a uniform diameter within about 160 mm from the bottom bracket junction 33, but begins gradually increasing its diameter after the intersection between the central axes of the main tube 26 and the tipper branch tube 24, to a maximum of about 150~220 mm, preferably about 190 mm.

Figure 7A:
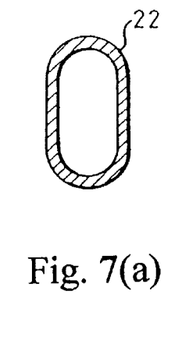
FIG. 7(a) is a cross-sectional view of the bicycle frame of the present invention, taken along line 7—7 of FIG. 1 (b).
Figure 7B:
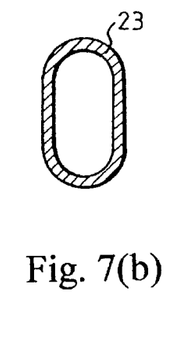
FIG. 7(b) is a cross-sectional view of the bicycle frame of the present invention, taken along line 7'—7' of FIG. 1 (b).

FIGS. 7(*a*) and 7(*b*) are the cross-sectional views of the main portions of the upper support paw 22 and the lower support paw 23, respectively, of the bicycle frame of the present invention. Both of them show elliptical cross-sections. The upper support paw 22 has it largest diameter (which is defined in this disclosure as the long, or major, axis of the ellipse) of about 70~80 mm, preferably about 75 mm, near the mud guard 39. The diameter of the upper support paw 22 decreases to a minimum of about 35~45 ram, preferably about 40 mm, near the dropout 21. The lower support paw 23 has its largest diameter of about 180~100 mm, preferably about 90 mm, near the bottom bracket tube 29. The diameter of the lower support paw 23 decreases to a minimum of about 35~45 mm, preferably about 40 mm, near the dropout 21'.

Figure 8A:
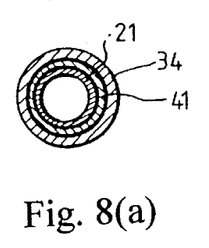
FIG. 8(a) is a cross-sectional view of the bicycle frame of the present invention, taken along line 8—8 of FIG. 1 (b).
Figure 8B:
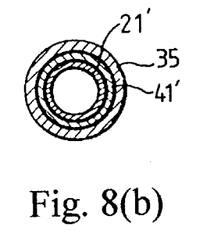
FIG. 8(b) is a cross-sectional view of the bicycle frame of the present invention, taken along line 8'—8' of FIG. 1(b).
Figure 9:
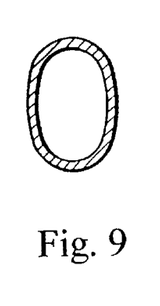
FIG. 9 is a cross-sectional view of the bicycle frame of the present invention, taken along line 9—9 of FIG. 1(b).

FIGS. 8(*a*) and 8(*b*) are the cross-sectional views of the rear portions of the upper support paw 22 and the lower support paw 23, near the dropouts 21 and 21', respectively. FIG. 8 shows the upper support paw 22 and the upper paw junction 35 are connected via glass fiber reinforced composite 41, which also serves as an insulation for the dropout 21. FIG. 8' shows the lower support paw 23 and the lower paw junction 34 are connected via glass fiber reinforced composite 41, which serves as an insulation for the dropout 21'. FIG. 9 is the cross-sectional view of the upper support paw 22 above the mud guard 39; it also has an elliptically shaped cross-section. The mud guard 39 has a maximum diameter of about 90~120 mm, preferably about 100 mm.

Figure 12:
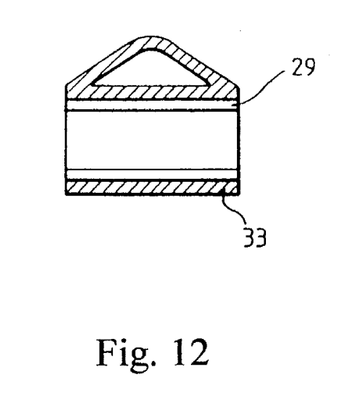
FIG. 12 is a cross-sectional view of the bicycle frame of the present invention, taken along line 12—12 of FIG. 1(b).
Figure 13:
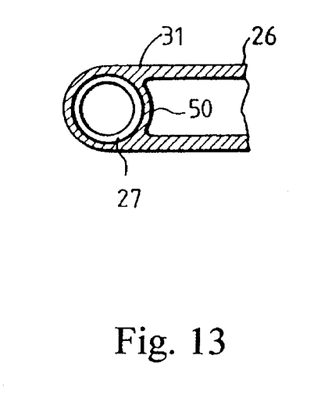
FIG. 13 is a cross-sectional view of the bicycle frame of the present invention, taken along line 13—13 of FIG. 1(b).
Figure 14:
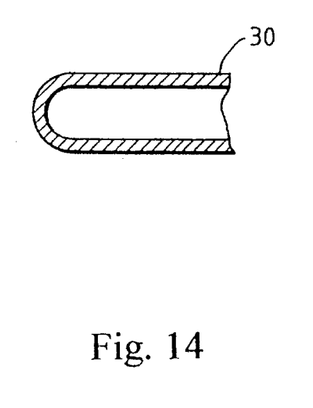
FIG. 14 is a cross-sectional view of the bicycle frame of the present invention, taken along line 14—14 of FIG. 1(b).
Figure 15:
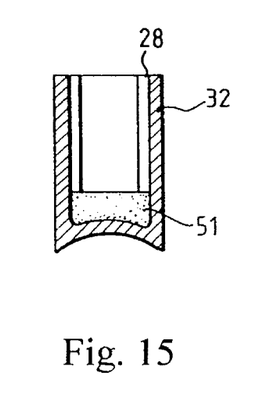
FIG. 15 is a cross-sectional view of the bicycle frame of the present invention, taken along line 15—15 of FIG. 1(b).

FIG. 12 is an axial cross-sectional view of the bottom bracket tube sleeve 29 being embedded inside the hollow bottom bracket junction 33. In FIG. 13, which is the cross-sectional view of the head tube sleeve 27 cutting across line 13—13, it is shown the head tube imbedded inside the generally hollow front junction 31, which is made of a hardened composite resin foam. In FIG. 13, it is also shown a prepreg patch 50 wrapped about the head tube sleeves 27. FIG. 15 shows the seat tube sleeve 28 embedded inside the generally hollow seat junction 32, which is made of hardened composite resin foam. A foamed material 51 is used to fill the inner cavity so as to provide increased strength. FIG. 14 shows the cross-section of the generally hollow common junction 30, which connects the main tube 26 with the upper branch 24 and the lower branch tube 25.

The present invention will now be described more specifically with reference to the following example. It is to be noted that the following descriptions of example including preferred embodiment of this invention are presented herein for purpose of illustration and description; it is not intended to be exhaustive or to limit the invention to the precise form disclosed.

Example 1

Figure 16:
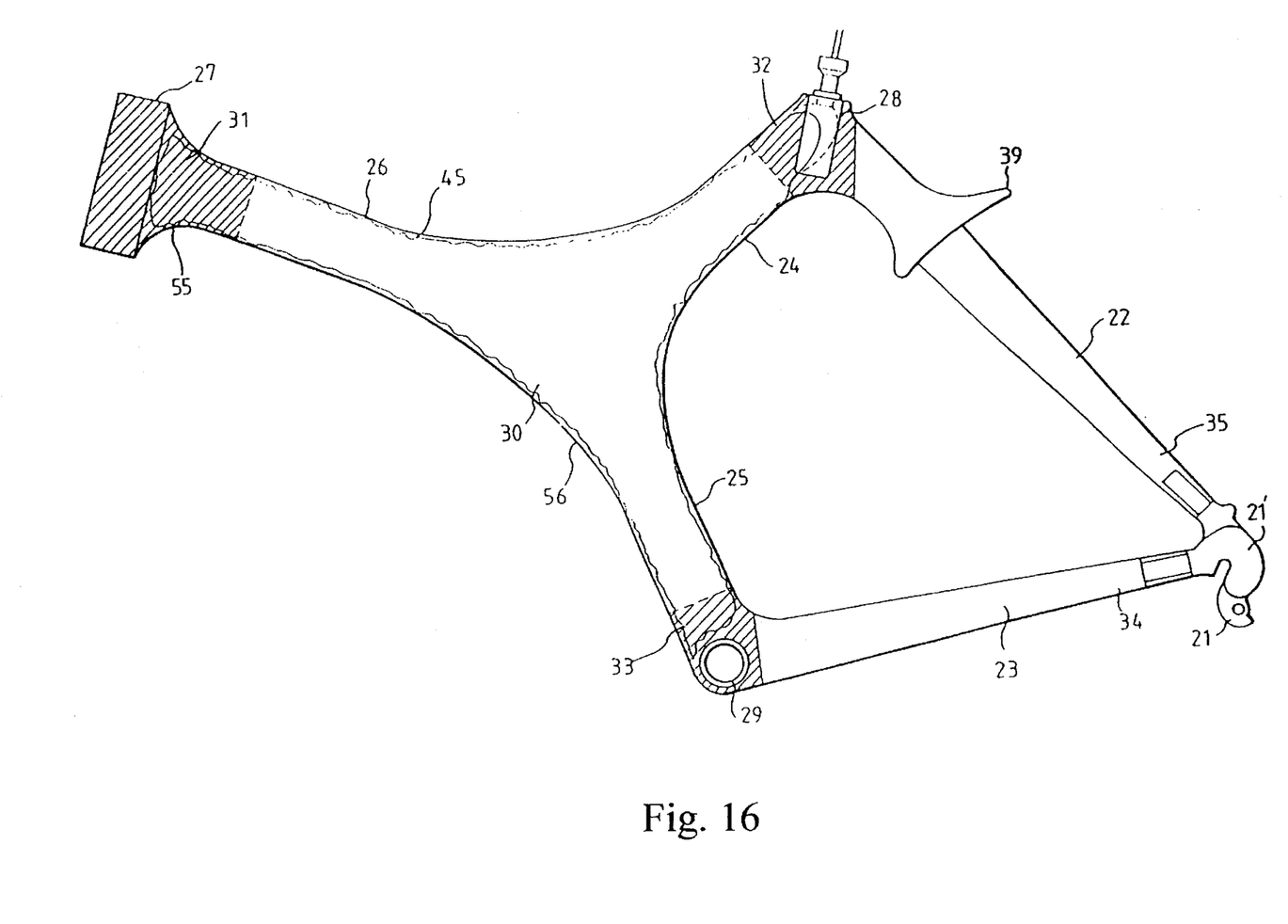
FIG. 16 is a schematic drawing showing the various steps in molding the preferred embodimemt of the bicycle frame of the present invention according to FIG. 1.

Now referring to FIG. 16, which is a schematic drawing showing the various steps in molding the preferred embodiment of the bicycle frame of the present invention according to FIGS. 1 (a)–1(c). The bicycle frame was made using a pressure molding process by introducing compressed air via a inflatable bladder 45 placed inside the mold 56, and heat-pressing the prepregs so as to harden and cure the composite resin.

All the tubular components, including the main tube 26, upper branch tube 24, lower branch robe 25, upper support pawl 22 and lower support pawl 23, are first wrapped about a mandrel. Then the mandrel was removed to reveal a thin-shelled hollow structure. The tubular components were united either using patches, which are prepregs with their fibers oriented in a single direction, or tapered unions to from a Y-shaped hollow thin shell, into which the inflatable bladder 45 would be placed.

Metal tubes, which will be embedded to form head tube sleeve 27, seat tube sleeve 28, and the bottom bracket sleeve 29, respectively, and dropouts 21, 21' were respectively placed together with their corresponding junctions 31, 32, 33, 34, and 35; thereafter, they were respectively adjoined with corresponding tubular components, using either patches or strips. After all the components were joined and properly placed inside the mold, the inflatable bladder 45 was placed inside the hollow space of the adjoined components. The inflatable bladder was connected to an air hose to allow air enter the hollow space and press the thin walls of the hollow components against the mold. During the pressure molding step, heat was applied to cause the composite resin to be cured (hardened) so as to form the final product.

Preferably, the strips were wrapped about the target component(s) in a spiral wrapping manner, so as to obtain the optimum strength. Alternatively, the strips were parallelly wrapped about the tube axis. In the latter approach, the strips were of a unified fiber orientation, and the length of the strips was similar to the length of the tubes. With spiral wrapping, it is preferred that at least two wrapping layers were applied, and the wrapping angles were conjugate of each other, so as to have two opposing and compensating wrapping directions. The width of the strips can vary according to the intended application. Preferably, the width of the strips is provided at 30–80 mm. Parallel strips were used to obtain surface smoothness. In this situation, no layering was necessary, and the parallel strips can be overlapped at their edges to provide connection. All the strips, whether used in spiral wrapping or parallel wrapping, were prepared having a single fiber direction and continuously wrapped about the tubes from one end thereof to another end.

All the tubular components were pre-formed by wrapping about a mandrel. The number of the wrapping layers depends on the intended function, which dictates the required thickness. After being hardened, an eight-layered prepreg would provide a wall thickness of about 1.5 mm. Wrapping angle (relative to the axis of the tube being wrapped) is another important factor affecting the performance of the final tubular product. About one-quarter to three-quarters (preferably one-half) of the prepregs are wrapped at a wrapping angle of 10°–45°, preferably at 25°. For the upper and lower support paws, a high wrapping angle is preferred, preferably at a wrapping angle as high as 70°. Wrapping angle can greatly affect the mechanical strength of the composite tubular components, so as to increase their torsional and lateral bending rigidity and improve their shock-absorbing capacity. It spiral wrapping, it was found that one layer was wrapped at a wrapping angle of 25°, best results were observed if the immediate next layer (the return layer) was wrapped at a wrapping angle of 130°, cross-overlapping the 25° layer.

In an alternative embodiment, the main tube 26, upper branch tube 24, lower branch tube 25, upper support pawl 22 and lower support pawl 23 can be hardened separately before their are placed inside the mold and joined by the various junctions and patches.

In overlapping the prepregs to prepare the various tubular components, it is preferred that the constituent fibers are oriented in a uniform direction extending from one of the tube to another end. If this is impossible and short fibers are to be used, it is preferred that the length of the fibers exceeds at least 100 mm, preferably greater than 150 mm, or more preferably greater than 300 mm. The use of prepregs with continuous long fibers has the advantage that it can cause the stress to be uniformly distributed along the finished product. The overlapped length is preferably about 25 mm, or more preferably, about 50 mm.

FIG. 16 also shows the thin-shelled bicycle frame of the present invention that has not been hardened. An inflatable bladder 45 was extended from the upper branch tube 24 to the main tube 26, the lower branch tube 25 and all the hollow junctions 30, 31, 32, 33. In order to provide uniform pressing in all parts of the frame, a single branched inflatable bladder or multiple inflatable bladders should be used which will be placed inside the thin shell. After the placement of the inflatable bladder 45, the thin-shelled body prepared by overlapped prepregs was placed inside a mold, and air, as indicated by the arrow, was introduced into the balloon 45 so as to tightly press the thin-shell body against the mold wall. At the same time, the mold was heated to harden the thin-shelled body. The upper and lower support paws 22, 23 can be pressurized with a heat expandable solid resin foam, which can be a foamable resin or a foamable adhesive foam. Alternatively, the upper and lower support paws can be pressure-molded using a inflatable bladder. In the latter approach, a inflatable bladder was placed inside the hollow thin-shelled bodies constituting the upper and lower support paws, respectively. Then they were placed inside their respective molds and pressed and heated to form the final products. After they were hardened and assumed their final shape, the upper and lower support paws 22, 23 were placed inside the mold shown in FIG. 16, where they were connected to the upper branch tube 24 and the lower branch tube 25 via the upper hollow junction 32 and bottom bracket junction 33, so as to be molded together with the front frame portion.

After the entire frame was hardened, it was removed from the mold and the inflatable bladder was pulled out from the finished frame. The foamed material can be removed using an appropriate solvent. However, because the foamed material occupied only a small volume and was light in weight, it can be retained inside the bicycle frame without being removed. An advantage of using the foamed material is that it can reduce the thickness of the shell body by about 30%. It is preferred that the prepregs are hardened at about 120° C. It is also preferred that the forming material comprises composite material which is a foamable adhesive film, and the curing temperature of the heat-foaming adhesive is also preferably at 120° C.

As discussed earlier, in pre-forming the various junctions, the appropriate tube sleeves and the dropouts have already been embedded inside the prepregs. Other bicycle components, such as brake cable, gear-changing cable and other fixed parts, can also be embedded inside the prepregs before the entire bicycle frame is heated and pressure-molded.

An adequate number of layers of prepregs must be embedded about the mandrel in order to obtain the desired thickness of the tube walls. In the thin-shelled frame as shown in FIG. 16, the wall thickness of the tubes preferably ranges between about 1.5 and 3.0 mm, or more preferably, between about 1.8 and 2.0 mm. Additionally, the majority of the stress was carried by the portions of the frame shown as elements 55 and 56. These include front junction 31, front portion of the main tube 26, lower junction 33 and lower portion of the lower branch tube 25. Consequently, more prepreg layers should preferably be applied in these places so that the wall thicknesses in these regions preferably range between about 3.0 and 4.5 mm, or more preferably, between about 3.0 and 4.0 mm. These emphasized portions 55 and 56 can also be implemented with strips, with a length preferably between about 100~200 mm and a width preferably between about 50~100 mm, which are wrapped about these regions 3~4 times so as to provide reinforcement. Other portions can also be reinforced in accordance with their intended functions.

Table 1 shows a comparison test in the vertical rigidity between a bicycle frame constructed according to the procedure described above and that of a conventional bicycle frame.

|  | Vertical Rigidity | Material |
|---|---|---|
| Conventional Bicycle Frame | 350 Kg/mm | Cr—Mo Steel |
| This Invention | 286 Kg/mm | Carbon |

From Table 1, it is shown that the present invention has effectively reduced the vertical rigidity.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A bicycle frame comprising a hollow front frame portion and a hollow rear frame portion, wherein said hollow front frame portion containing:

(a) a generally hollow common junction;

(b) a main tube connected between a front fork assembly of said bicycle and a middle portion of said generally hollow common junction in a slanted manner;

(c) an upper branch tube connected between a seat assembly of said bicycle and an upper portion of said generally hollow common junction in a slanted manner;

(d) a lower branch tube connected between a pedal axle support assembly of said bicycle and a lower portion of said generally hollow common junction in a slanted manner;

(e) said generally hollow common junction, said upper branch tube and said lower branch tube contain at least one layer of a fibrous material impregnated with a synthetic resin and are integrally molded together to form a unitary front frame portion;

and said rear frame portion containing:

(f) an upper support paw connected between said seat assembly and a rear wheel assembly of said bicycle, said upper support paw being disposed at one side of said rear wheel assembly; and (g) a lower support paw connected between said pedal support assembly and said rear wheel assembly, said lower support paw being disposed at another side of said rear wheel assembly.

2. A bicycle frame according to claim 1 wherein said upper and lower support paws are connected to said rear wheel assembly via first and second dropouts, respectively.

3. A bicycle frame according to claim 1 wherein said upper support paw is disposed at the same side as a drive chain of said bicycle.

4. A bicycle frame according to claim 1 wherein said upper support paw is provided with a mud guard disposed near said seat assembly.

5. A bicycle frame according to claim 4 wherein said mud guard being curved opposing a curvature of said rear wheel.

6. A bicycle frame according to claim 1 wherein each of said upper support paw and said lower support paw has a generally hollow structure and contains at least one layer of a fibrous material impregnated with a synthetic resin.

7. A bicycle frame according to claim 2 wherein said upper and lower support paws are constructed to have a generally hollow elliptical cross-section, which tapers to a generally hollow circular section near said dropouts.

8. A bicycle frame according to claim 1 which further comprising:

(a) a generally hollow front junction for connecting said main tube with a head tube sleeve, said head tube sleeve being provided for receiving said front fork assembly;

(b) a generally hollow seat junction for connecting said upper branch tube with a seat tube sleeve and said hollow upper support paw, said seat tube sleeve being provided for receiving said seat assembly; and (c) a generally hollow bottom bracket junction for connecting said lower branch tube with a bottom bracket tube sleeve and said hollow lower support paw, said bottom bracket tube sleeve being provided for receiving said pedal support assembly;

(d) wherein each of said generally hollow front, seat and bottom bracket junctions contains at least one layer of a fibrous material impregnated with a synthetic resin.

9. A bicycle frame according to claim 8 wherein each of said junctions is connected to one or more of said tubes or tube sleeves via overlapping edges of said resin impregnated fibrous material.

10. A bicycle frame according to claim 9 wherein said resin impregnated fibrous material is provided in the form of strip prepregs.

11. A bicycle frame according to claim 8 wherein said hollow front junction contains at least one of said prepregs whose edges overlapped itself or another of said prepregs in a direction parallel to said head tube sleeve.

12. A bicycle frame according to claim 8 wherein said generally hollow bottom bracket junction contains at least one of said resin impregnated fibrous material, which wraps about said lower branch tube, said lower support paw, and said bottom bracket tube sleeve, and the edges of said resin impregnated material overlapped itself or another of said resin impregnated fibrous material in a direction parallel to said bottom bracket tube.

13. A bicycle frame according to claim 8 wherein said generally hollow seat junction contains at least one of said resin impregnated fibrous material, which wraps about hollow upper branch tube, said hollow upper support paw, and said seat tube, and the edges of the resin impregnated fibrous material overlapped itself or another of said resin impregnated fibrous material in a direction parallel to said seat tube.

14. A bicycle frame according to claim 8 wherein said generally hollow common junction, said main tube, said upper branch tube, said lower branch tube, said upper support paw, and said lower support paw are all preformed and placed in a mold before they become hardened and integrally molded together to form a unitary frame portion.

15. A bicycle frame according to claim 14 wherein said upper support paw and/or said lower support paw have been hardened before they are placed in a mold to form a unitary frame portion.

16. A bicycle frame according to claim 8 wherein each of said main tube, said upper branch tube, said lower branch tube, said upper support paw, and said lower support paw each contain at least a prepreg, which contains resin impregnated fibers that are orientated along each of said tubes or paws, respectively.

17. A bicycle comprising a front fork assembly, a seat assembly, a pedal axle support assembly, a rear wheel assembly a head tube sleeve for receiving said front fork assembly, a seat tube sleeve for receiving said seat assembly, and a bottom bracket tube sleeve for receiving said pedal support assembly; said bicycle being characterized in that if further comprising (a) a hollow slanted-Y-shaped front frame portion comprising:
  (I) a generally hollow common junction;
  (ii) a main tube connected between said heat tube sleeve and a middle portion of said generally hollow common junction in a slanted manner;
  (iii) an upper branch tube connected between said seat tube sleeve and an upper portion of said generally hollow common junction in a slanted manner; and
  (iv) a lower branch tube connected between said bottom bracket tube sleeve and a lower portion of said generally hollow common junction in a slanted manner;

(b) a rear frame portion comprising:
  (I) an upper support paw connected between said seat tube sleeve and said rear wheel assembly via a first dropout, and a lower support paw connected between said pedal support assembly and said rear wheel assembly, said upper support paw and said lower support paw being disposed at opposite sides of said rear wheel assembly; and
  (ii) a generally hollow front junction for connecting between said main tube and said head tube sleeve, a generally hollow seat junction for connecting among said upper branch tube said seat tube sleeve and said upper support paw, and a generally hollow bottom bracket junction for connecting among said lower branch tube, said bottom bracket tube and said lower support paw;

(c) wherein each of said main tube, said upper and lower branch tubes, said upper and lower support paws, and said junctions comprising at least a fibrous material impregnated with a synthetic resin, and said tubes, paws, and junctions being integrally united by overlapping edges of said resin impregnated fibrous material so as to form a unitary, bicycle frame.

18. A bicycle according to claim 17 wherein at least 80 percent of said fibrous material contained in said tubes or paws being oriented in the same direction.

19. A bicycle according to claim 17 wherein said fibrous material contained in said tubes or paws being at least 4 inches in length.

20. A method for making slanted-Y shaped bicycle frame with reduced vertical rigidity for comfort and improved flexibility for drive chain assembly design comprising the steps of:

(a) pre-forming a generally hollow common junction, a main tube, an upper branch tube, a lower branch tube, an upper support paw, a lower support paw, and a set of generally hollow front, seat tube and bottom bracket junctions;

(b) using strip prepregs, which contain fibrous material impregnated with a synthetic resin, to connect said generally hollow common junction with said main tube, said upper branch tube, and said lower branch tube in a slanted-Y shape;

(c) using said strip prepregs to connect said upper support paw with said seat tube junction and said upper branch tube such that said upper support paw will be disposed at one side of a rear wheel of said bicycle;

(d) using said strip prepregs to connect said lower support paw with said bottom bracket junction and said lower branch tube such that said lower support paw will be disposed at another side of said rear wheel;

(e) placing an inflatable bladder inside a hollow structure formed in steps (b) through (d);

(f) placing said hollow structure obtained from step (e) into a bicycle frame mold; and (g) pumping air into said inflatable bladder while applying heat so as to cause said impregnated strips to be hardened.

21. The method according to claim 20 wherein said strip prepregs are applied by spirally wrapping said strip prepregs around objects to be connected.

22. The method according to claim 21 wherein at least two layers of said strip prepregs having crossing fiber orientations are applied.

23. The method according to claim 21 wherein said strip prepregs have a thickness of about 30 to 80 mm.

24. The method according to claim 20 wherein said main tube, upper branch tube, lower branch tube are pre-formed by wrapping said strip prepregs about a mandrel at a wrapping angle of between 10° and 45°.

25. The method according to claim 20 wherein said upper support paw and said lower support paw are pre-formed by wrapping said strip prepregs about a mandrel at a wrapping angle of about 70°.

* * * * *